United States Patent
Größler (10) Patent No.: US 8,661,855 B2
(45) Date of Patent: Mar. 4, 2014

(54) METHOD AND APPARATUS FOR THE REMOVAL OF MOLTEN GLASS FROM FLOW CHANNELS

(75) Inventor: Jürgen Größler, Karlstadt-Karlburg (DE)

(73) Assignee: Beteiligungen Sorg GmbH & Co. KG, Lohr am Main (DE)

( * ) Notice: Subject to any disclaimer, the term of this patent is extended or adjusted under 35 U.S.C. 154(b) by 399 days.

(21) Appl. No.: 12/162,414

(22) PCT Filed: Nov. 27, 2007

(86) PCT No.: PCT/EP2007/010264
§ 371 (c)(1),
(2), (4) Date: Jul. 28, 2008

(87) PCT Pub. No.: WO2008/067929
PCT Pub. Date: Jun. 12, 2008

(65) Prior Publication Data
US 2008/0314086 A1    Dec. 25, 2008

(30) Foreign Application Priority Data
Dec. 7, 2006   (DE) .......................... 10 2006 058 044

(51) Int. Cl.
*C03B 7/06*       (2006.01)
(52) U.S. Cl.
USPC ................................. 65/327; 65/325; 65/326
(58) Field of Classification Search
USPC .................................................. 65/325–327
See application file for complete search history.

(56) References Cited

U.S. PATENT DOCUMENTS

| 4,027,091 A | 5/1977 | Pieper |
| 4,872,897 A | 10/1989 | Krejci et al. |
| 5,022,910 A | 6/1991 | Duvierre et al. |

FOREIGN PATENT DOCUMENTS

| DE | 2017096 | 11/1971 |
| DE | 24 61 700 | 7/1976 |

(Continued)

OTHER PUBLICATIONS

Machine Translation of DE 19935664.*

(Continued)

*Primary Examiner* — Joseph S Del Sole
*Assistant Examiner* — Russell Kemmerle, III
(74) *Attorney, Agent, or Firm* — Greer, Burns & Crain Ltd.

(57) ABSTRACT

A process and apparatus for removing molten glass from flow channels for the transport of production glass that are installed between a melting furnace and an extraction point for the production glass. The flow channel has a glass-resistant inner lining. A drainage unit for bottom glass is installed upstream of the extraction point for the production glass. In order to keep electrodes away from the molten glass, but still maintain a local and temporal influence on the temperature profile within the cross section, the inner lining, at least in the area of the drainage unit, is formed of a fusion cast electrically conductive material which has a drainage opening for the bottom glass with a drainage slit above it. At least two electrodes are installed on opposite sides of the flow channel and the drainage unit for the bottom glass. The electrodes are rod-shaped and their front ends are inserted so deeply into the inner lining in the direction of the molten glass, without contact with the molten glass, so that the majority of the electric current from the electrodes passes through the molten glass to reach an electrode plate installed below the drainage opening.

18 Claims, 6 Drawing Sheets

(56) References Cited

FOREIGN PATENT DOCUMENTS

| | | |
|---|---|---|
| DE | 40 06 229 | 11/1992 |
| DE | 19935664 | 8/2000 |
| EP | 0329930 | 8/1989 |
| GB | 888 956 | 2/1962 |

OTHER PUBLICATIONS

HVG-Mitteilung Newsletter Nr. 1671, Aug. 1988 (pp. 1-11).
Conti-Drain, eine Lösung von Sorg bei zirkonhaltigen Schlieren in der Produktion (pp. 47-50.
ABC Glas, pp. 22-25.
Glasschmelzöfen book, Springer-Verlag, 1984, pp. 66-68.

* cited by examiner

METHOD AND APPARATUS FOR THE REMOVAL OF MOLTEN GLASS FROM FLOW CHANNELS

BACKGROUND OF THE INVENTION

The invention relates to a method for removing molten glass from flow channels for the transport of production glass, these channels being installed between a melting furnace and an extraction point for the production glass, whereby the flow channel has a glass-resistant inner lining, the exterior of which is surrounded by mineral thermal insulation material and whereby a drainage appliance for bottom glass is installed upstream of the extraction point for the production glass.

In order to be able to evaluate the state-of-the-art and the invention it is advisable to consider, on the one hand, details of the constructional elements of heated flow channels that are also referred to as feeders or forehearths and, on the other hand, the elements of the electrical current paths and the heat thereby produced in such flow channels.

Both the mineral internal surfaces of the flow channels and the metal external surfaces of electrodes are susceptible in varying degrees to attack by normal glass melts, whereby the reaction products are heavier than the molten glass and collect on the bottom of the flow channel in the form of contaminated bottom glass. The reaction products of the glass with metal electrodes that are immersed directly in the molten glass are particularly damaging. Other contaminants such as stones and knots are also deposited in the bottom glass.

The molten glass above the bottom glass is intended for the manufacture of products and therefore termed production glass. This production glass is removed at an extraction point, either continuously, e.g., for the production of flat glass, or in portions, e.g., as gobs for the manufacture of bottles and drinking vessels.

If the bottom glass that is separated from the production glass by a phase boundary is not removed, either continuously or intermittently, through a drainage opening upstream of the extraction point for the production glass, then the production glass becomes contaminated by the bottom glass and cannot be used. Among other things, this leads to impairment of the transparency, for example as a result of discolouration and/or the formation of cords, known in the industry as "cat scratches."

Another problem area lies in the type and shape of the mineral materials used for the flow channel and their geometric location relative to the electrodes. If, as is known, the inner lining of the flow channel comprises of a fusion cast material from the group of AZS or ZAC materials, such as an $Al_2O_3$—$ZrO_2$—$SiO_2$, also known as ternary systems, then the electrical conductivity is approximately 20 times higher than that of normal mineral materials, such as those used for the thermal insulation of the flow channels. As a result, the electrical current paths tend to run through such materials, whereby the shape of the materials and the spatial coordinates of these current paths within these materials and the passage and course of the current paths from the individual electrodes, to and in the glass melt, must also be determined. However, there is also interaction between these current paths and the spatial coordinates of the temperatures to consider.

This results in certain relationships between the relative values of the currents that flow through the mineral materials and the molten glass, and the resulting localised heating effect. The electrical conductivity, or the specific electrical resistance, for both the glass and the mineral materials are extremely temperature dependent over several orders of magnitude within a temperature range between 700 and 1700° C. The results are therefore based on numerous, intensive and expensive tests, undertaken until the best possible solution is found. The rate of temperature change in the area around the drain opening also plays a role in this respect.

State-of-the-Art

From the HVG-Mitteilung (=HVG-Newsletter) No. 1617 and a paper given on 20 Apr. 1988 and the German patent DE 40 06 229 C2 it is known that to prevent the formation of cords, so-called "cat scratches," in the end production, a so-called drainage opening (a second bottom outlet) can be installed in a feeder of a glass melting installation upstream of the bottom outlet for molten production glass and its end products. It is also possible to provide a bottom barrier after the bottom outlet to prevent the heavier bottom glass from progressing to the production outlet. However, no mention is made of directly associated heating systems, their control systems or spatial temperature coordinates.

From European patent EP 0 329 930 B1 from 1989 and the article by Herbert Lutz entitled "CONTI-DRAIN®, a Sorg® solution for zircon cords in production," published in Glas-Ingenieur, 1-99, pages 47 to 50, it is also known that an electrode for connection to a transformer with a thyristor unit can be installed below a nozzle used to drain the bottom glass that forms zircon cords. The power is controlled by a temperature sensor installed near the bottom outlet. However, it is explicitly stated that a counter-electrode must be installed in the molten glass. However, as these counter-electrodes must be made of a metal, albeit one with a high melting point such as molybdenum, it is not possible to prevent these electrodes from slowly dissolving in the glass. This process is known and leads to contamination of the glass. It is counter productive and simply replaces one problem with another. The documents mentioned describe the possibilities for controlling the correlations as being vague and mostly unclear and imperfect.

In this respect the following should be noted: direct electric heating using metal electrodes such as molybdenum, or zirconium electrodes is not without problems, especially in connection with flint glass. Complex reactions take place on the electrode surface and cause the formation of a contact layer. This layer is made of several components, however, it is comprised mainly of compounds of the metal and oxygen, or sulphur. Although it is basically a thin layer, changes in the operating conditions can cause erosion of some of the layer, and this appears as a dark mark in the production glass. Another consequence is the frequent occurrence of oxygen bubbles that appear either simultaneously or later.

Although German patent DE 24 61 700 C3 published in 1974 teaches that the metal electrodes can be removed from the direct influence of the glass and that certain ceramic linings or inner coatings in the feeder, known in the trade as ZAC, can be used between the electrodes and the glass melt. The electrical resistance of such ceramic materials have a negative coefficient, i.e., their conductivity increases as the temperature rises, as is also the case with glass. When the temperature distribution is uneven as a result of changes in the thermal balance between the heating and the cooling, very different spatial coordinates for the individual electric current paths ensue. Some current paths between the electrodes behind and below the surface areas of the external refractory cladding are indicated, but not the current paths, or the possibilities to control them, to a circular electrode installed below the bottom outlet for the production glass. No mention is made of any heatable drainage opening installed upstream of the production outlet.

Through German patent DE 2 017 096 A1 it is known that it is possible to install a row of circular electrodes vertically and co-axially below a bottom outlet of a feeder in order to control glass removal. It is also possible to insert a concentric electrode lance through these circular electrodes. Molybdenum is given as the material for the electrodes. This material also comes into contact with the molten glass, albeit only after it has left the feeder. It is also given that such a system can be installed either below a feeder for draining the surface glass, i.e., the production glass, or in the tank bottom for draining the bottom glass. However, experience has shown this level of choice is not available in practice as conditions differ. In particular, despite the glass contact, such a system does not have an extensive thermal influence on the molten glass flow in the feeder or flow channel.

SUMMARY OF THE INVENTION

The object of the invention is therefore to describe a method for removing the molten glass from flow channels and an apparatus to achieve this using electrodes that interact electrically and thermally with a drainage outlet that has a circular counter electrode, whereby the electrodes are protected from the direct influence of the molten glass, but the effective electrode ends still have a local and temporal influence on the temperature profile within the cross section of the molten glass flow in the flow channel and/or through the drainage opening.

The object of the invention is accomplished in accordance with the process described above in that:

a) the inner lining, at least in the area of the drainage equipment is made of a fusion cast, electrically conductive mineral material from the group of AZS and ZAC compositions, whereby a drainage opening for the bottom glass is installed in the inner lining, and above this drainage opening there is a drainage slit that runs across the flow direction, and that b) at least two electrodes are installed on opposite sides of the flow channel and the drain for the bottom glass. Such electrodes are rod-shaped and the front ends are inserted deeply into the inner lining towards the molten glass without contact with the molten glass, such that the majority of the electrical current flows through the molten glass to a electrode plate installed below the drainage opening, so that the bottom glass is heated more strongly than the production glass above it.

Advantages of the Invention

The object of the invention is thereby completely solved. In particular, on the one hand the electrodes are protected from the direct influence of the molten glass, on the other hand the effective electrode ends still have a spatial and temporal influence on the locations of the current paths and the temperature profile within the cross-section of the molten glass in the flow channel and/or over the drainage opening. In accordance with further embodiments of the method according to the invention it is particularly advantageous if—either individually or in combination:

the opposing electrodes are installed above a virtual horizontal plane in which a phase boundary between the production glass and the bottom glass exists and/or, when the opposing electrodes are installed below a virtual horizontal plane in which a phase boundary between the production glass and the bottom glass exists.

Achievements by Means of the Inventive Apparatus

The invention also relates to an apparatus for the removal of molten glass from flow channels for the transport of production glass, these channels being installed between a melting furnace and an extraction point for the production glass, whereby the flow channel has a glass-resistant inner lining, the exterior of which is surrounded by mineral thermal insulation material and whereby a drainage appliance for bottom glass is installed upstream of the extraction point for the production glass.

To accomplish this object and to offer the same advantages such an apparatus according to the invention is characterized by the fact, that a) the inner lining, at least in the area of the drainage equipment, is made of a fusion cast, electrically conductive mineral material from the group of AZS and ZAC compositions, whereby a drainage opening for the bottom glass is installed in the inner lining, and above this drainage opening there is a drainage slit that runs across the flow direction, and that b) at least two electrodes are installed on opposite sides of the flow channel and the drain for the bottom glass. Such electrodes are rod-shaped and the front ends are inserted deeply into the inner lining towards the molten glass without contact with the molten glass, such that the majority of the electrical current flows through the molten glass to an electrode plate installed below the drainage opening, In accordance with further embodiments of the method according to the invention it is particularly advantageous if—either individually or in combination:

the electrodes are installed opposite one another above an opening for the entry of the bottom glass, the electrodes are installed opposite one another below an opening for the entry of the bottom glass, there is a drainage slit in the inner lining above the drainage outlet and this slit—when viewed perpendicular to the main axis of flow of the flow channel—narrows from the inlet opening down two sloping surfaces to the drainage outlet, the sloping surfaces are aligned at an angle "α" between 15 and 45 degrees to the horizontal, and/or the electrode axes are aligned horizontally with the axis (A-A) that runs through the drainage outlet.

BRIEF DESCRIPTION OF THE DRAWINGS

Two examples of the object of the invention and their method of operation and other advantages are described in detail with reference to FIGS. 1 to 6 below. The figures show:

FIG. 1a vertical central longitudinal section through the end of a flow channel furthest from the furnace, FIG. 2 a vertical cross-section along the line II-II in FIG. 1 through a first example of the invention, in which the electrodes are installed above the entry opening of a drainage slit, FIG. 3 a vertical cross-section similar to FIG. 2 through a second example of the invention, in which the electrodes are installed below the entry opening of a drainage slit, FIG. 4 a 3-dimensional view of the main elements in the area of the drainage slit and the drainage opening, FIG. 5 an enlarged section taken from FIG. 3 in the area of the drainage opening and FIG. 6 a diagram, in which the specific electrical resistances of certain fusion cast refractory materials such as ZAC 1711 and ZAC 1681 and for certain glass types are shown in ohm.cm for the relevant temperature range between 800 and 1500° C.

DETAILED DESCRIPTION OF THE PREFERRED EMBODIMENTS

Figure 1:
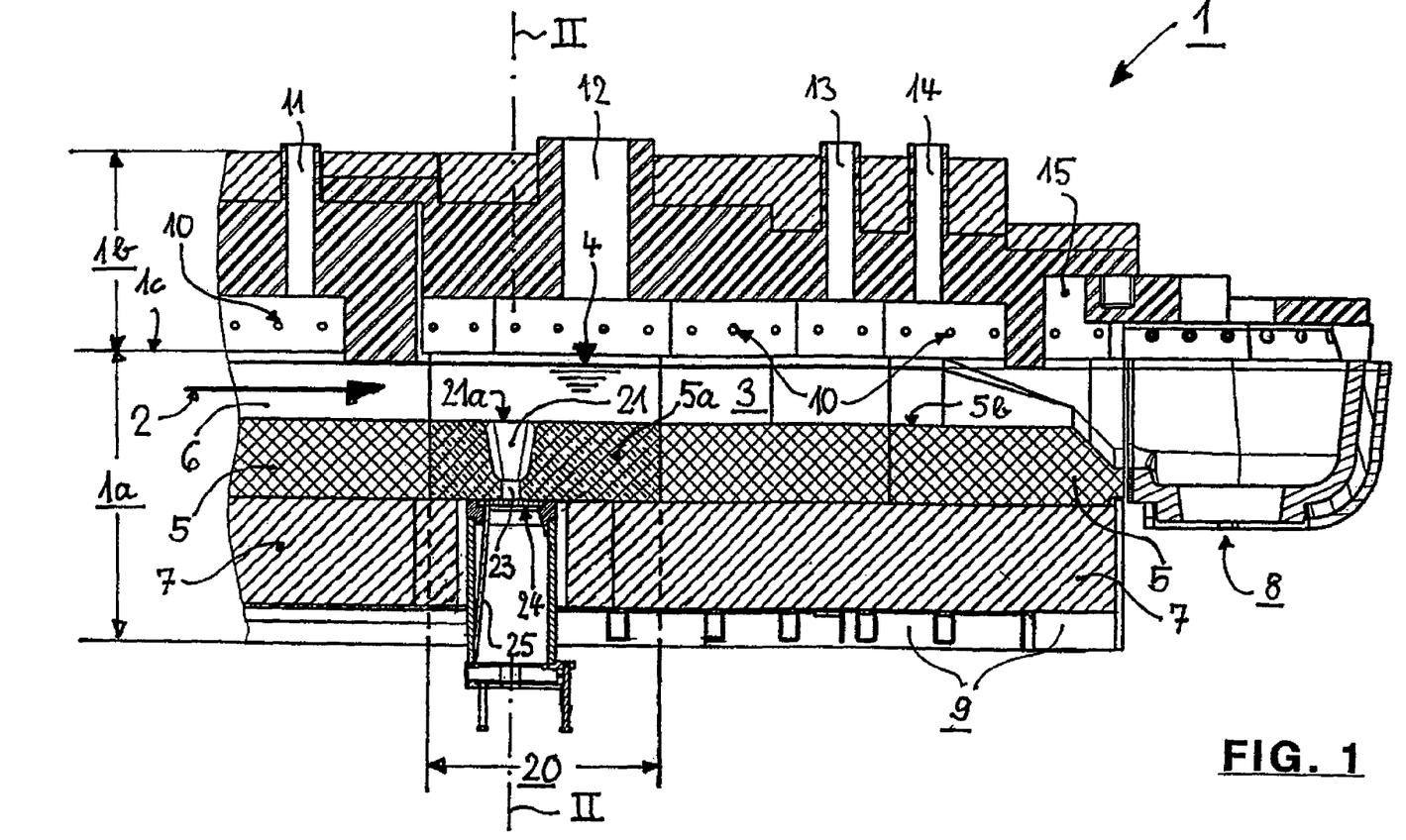

FIG. 1 shows the end of a flow channel 1, the beginning of which, not shown here, is connected to a glass furnace. This determines the flow direction 2 of the molten glass 3, which has a melt surface 4. The flow channel 1 has a glass-resistant inner lining 5, 5a, whereby the inner lining 5a forms a partial area comprising a fusion cast mineral material from the group of AZS and ZAC compositions.

With regard to this Dr. Illig describes in "ABC Glas," published by Deutscher Verlag for the Raw Material Industry, Leipzig, 1991, page 23: AZS refractories—alumina-zircon-silicate refractories->refractory products containing zircon. On pages 235/236 under "fusion cast refractories" their particular suitability for glass melting; and on page 303, under "refractory products containing zircon" their particular suitability in the substructure of furnaces and forehearths for glass melting.

In "Glass Furnaces, Design, Construction and Operation", published by Springer Verlag, 1984, on page 63 under 4.2.4 "fusion cast blocks," using the terms corundum-zircon refractories (CZ blocks), W. Trier also describes their particular suitability for electrically heated glass furnaces as they demonstrate relatively low electric resistance. Illustration 4.3 on page 64 shows a diagram of the temperature dependence of the specific electrical resistance of furnace refractories and some glasses within the temperature range 800-1500° C. On page 63 table 4.4 "chemical and mineralogical composition and physical properties of fusion cast refractories" for the zircon corundum group includes under "corundum-zircon refractories" the details ER1681 and ER1711. Note: the terms ZAC 1681 and ZAC 1711 are also used in this respect.

The flow channel 1 has a substructure 1a and a superstructure 1b, separated from one another by a joint 1c. The glass melt surface 4 is immediately below this joint 1c. The superstructure 1b is constructed in layers, but it is not necessary to describe this in detail here. The superstructure 1b is heated by two rows of gas burners 10 installed on opposite sides. These burners are indicated here only by their outlet apertures. Along the flow direction 2 there follow a measuring opening 11, a waste gas flue 12 for the flue gases from the gas burners 10 and two measuring openings 13 and 14. The measuring openings can be used for the introduction of pyrometers or thermocouples. The space 15 is a free space for the installation of a barrier The inner lining 5, 5a has bottom surface 5b and two opposing side walls 6 and is surrounded on the bottom and on the sides by standard mineral thermal insulation material 7. At the end of the flow channel 1 there is an extraction point 8 for the production glass, installed at a lower level than the bottom surface 5b. Control equipment for continuous or discontinuous delivery of the molten glass is not shown at the extraction point. The complete bottom part 1a of the flow channel 1 is supported on a frame 9.

Drainage equipment 20 for the so-called bottom glass is installed upstream of the production glass extraction point 8. The main element of this equipment is a drainage slit 21 that runs perpendicular to the flow direction 2 and is symmetrical about the vertical axis II-II. Variations of the design principles are detailed in FIGS. 2, 3, 4 and 5, using the same reference numbers.

Figure 2:
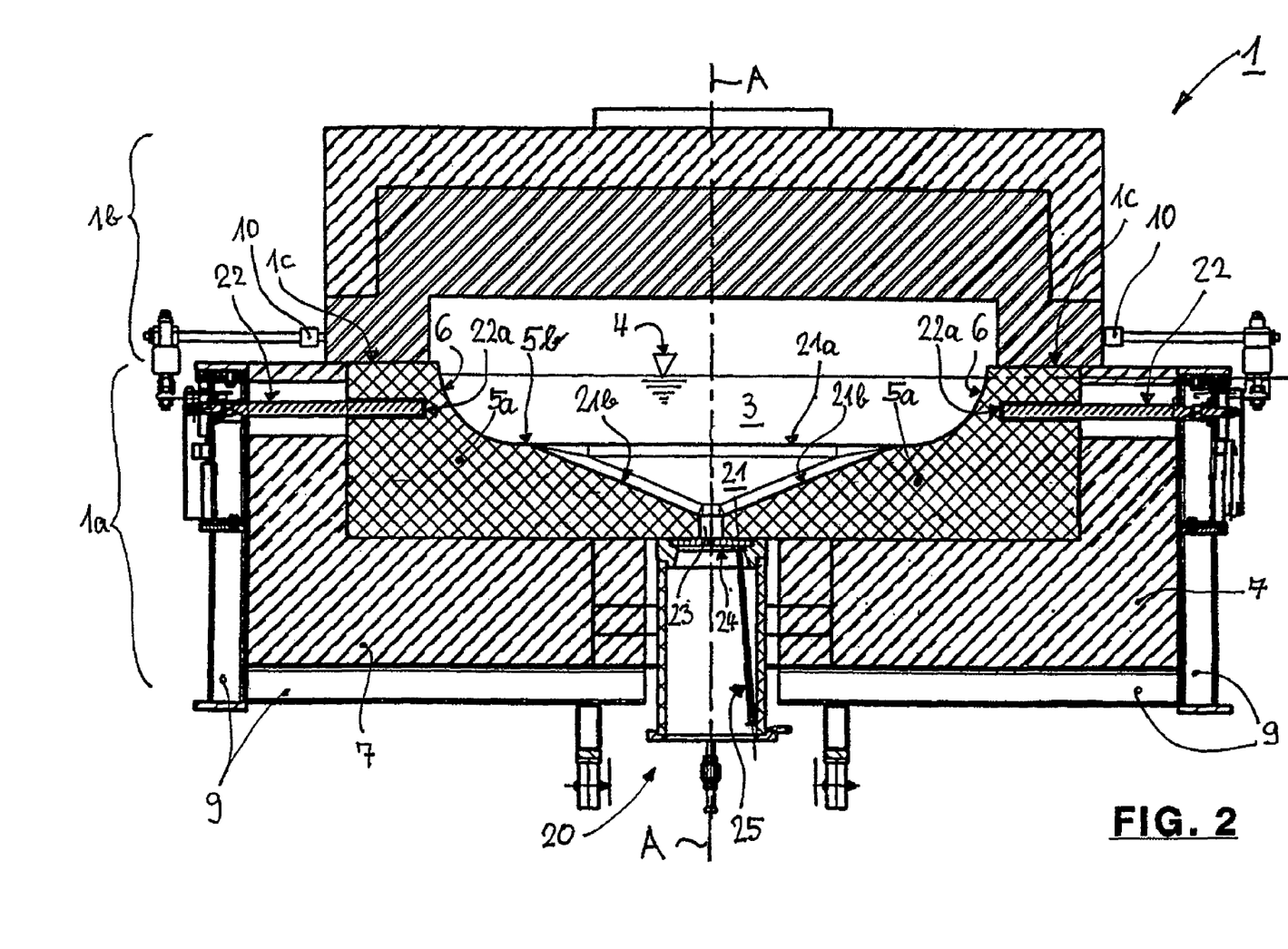

In the example shown in FIG. 2 two horizontal electrodes 22 are installed opposite one another, the front end surfaces 22a of which are located above the inlet opening 21a of the drainage slit 21. From this inlet opening 21a two symmetrical sloping surfaces 21b lead to the cylindrical drainage opening 23, below which a circular electrode plate 24 with a connection cable 25 is installed. A pressure spring at the rear end of the electrodes 22 puts the front end surfaces 22a under compression. On account of the short distance between the end surfaces 22a and the interface between the inner lining 5a and the molten glass 3 the majority of the electrical current flows directly to the molten glass 3 and from there to the drainage slit 21 and through the drainage opening 23 to the electrode plate 24.

Owing to the temperature range normally used for such processes, the molten glass has an even lower electrical resistance coefficient than the material of the inner lining 5a which is at an even lower temperature. Therefore a significant part of the energy develops in the bottom area of the flow channel 1 and in particular inside the drainage slit 21, and this leads to a significant improvement in the run-off of the problematic zircon-containing bottom glass, the viscosity of which is higher than that of the production glass at comparable temperatures.

In the example shown in figures FIGS. 3 and 5, two electrodes 26 are installed horizontally opposite one another, with their front end surfaces 26a below the inlet opening 21a of the drainage slit 21. From this inlet opening 21a two symmetrical sloping surfaces 21b lead to the cylindrical drainage opening 23, below which a circular electrode plate 24 with a connecting cable 25 is installed. A pressure spring at the rear end of the electrodes 26 puts the front end surfaces 26a under compression. On account of the short distance between the front end surfaces 26a and the interface between the inner lining 5a and the molten glass 3 the majority of the electrical current flows directly to the molten glass 3 and from there to the drainage slit 21 and through the drainage opening 23 to the electrode plate 24, indicated by thick lines in FIG. 5.

Figure 3:
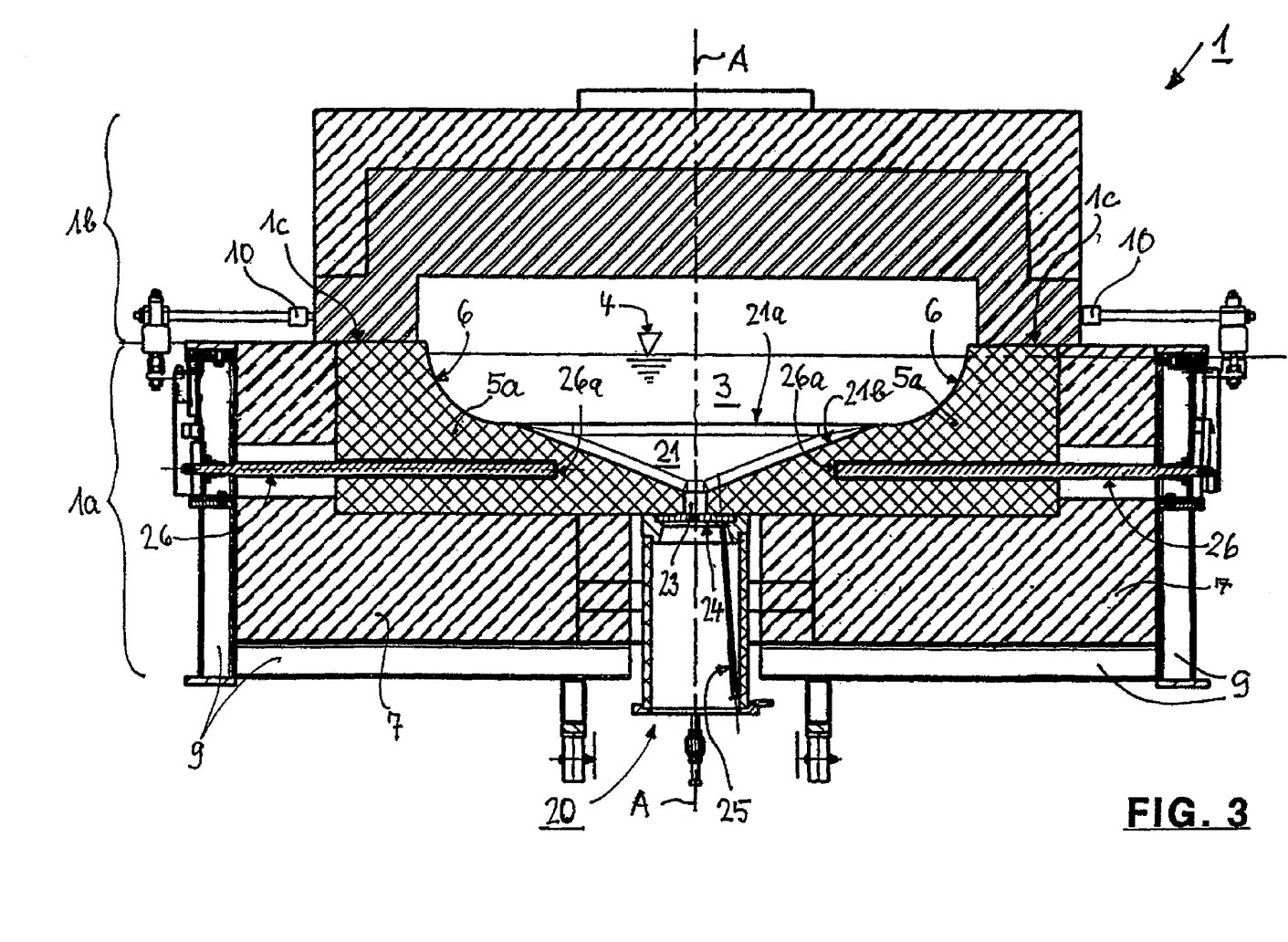

It is particularly preferable if the horizontal axes of the electrodes 22 and 26—all at the same height—are in line with axis II-II (FIG. 1) and of course the design principles of FIGS. 2 and 3 can also be combined with one another, i.e., the drainage slit 21 would then be fitted with two pairs of electrodes 22 or (or and??) 26. In principle FIGS. 2 and 3 are laid one upon the other.

Owing to the temperature range normally used for such processes the molten glass has an even lower electrical resistance coefficient than the material of the inner lining 5a which is at an even lower temperature. Therefore a significant part of the energy develops inside the drainage slit 21, and this leads to a significant improvement in the run-off of the problematic zircon-containing bottom glass, the viscosity of which is higher than that of the production glass at comparable temperatures.

Figure 4:
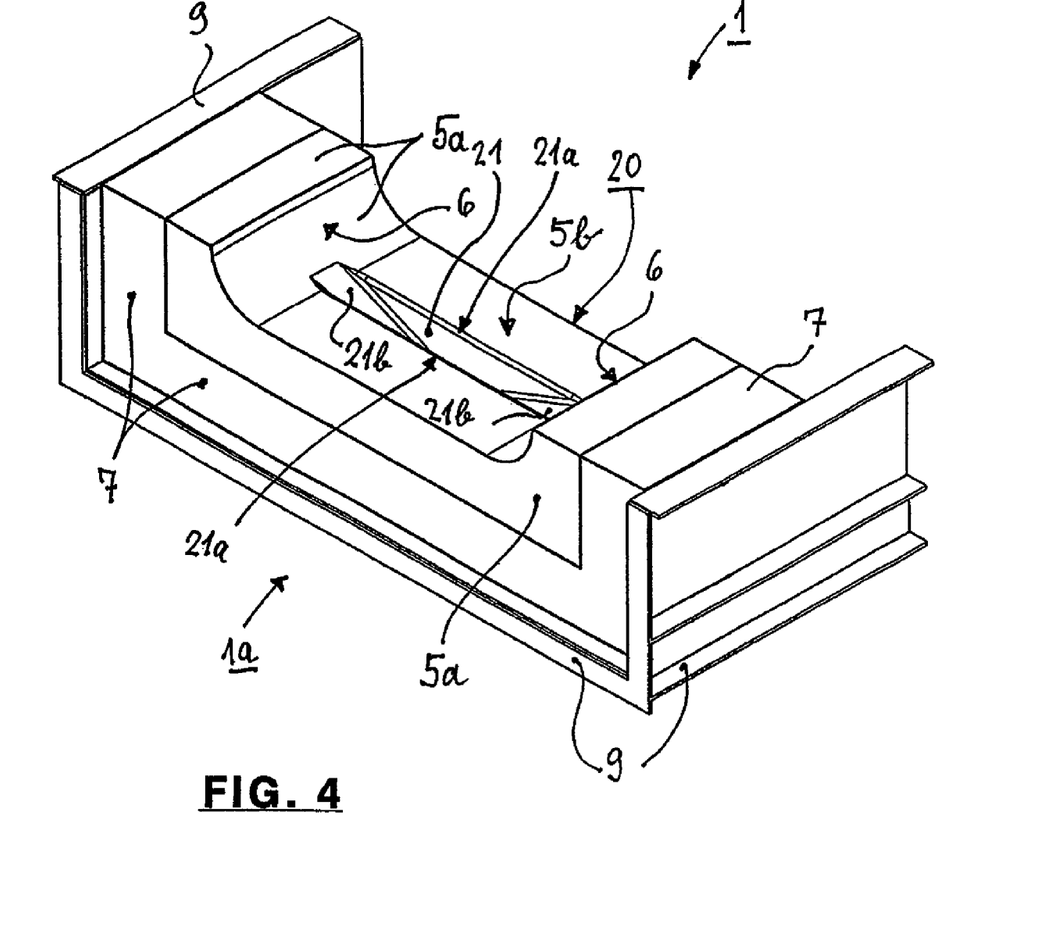

FIG. 4 uses the same reference numbers and shows a 3-dimensional view of the main elements near the inner lining 5a with the slit-shaped drain 21 and its inlet opening 21a. It can be seen that the drainage slit 21, that extends perpendicular to the longitudinal or flow direction of the flow channel, is basically as long as the total width of the horizontal and flat bottom surface 5b. As a result, the bottom glass is prevented from reaching the production glass extraction point 8. The transitions from the bottom surface 5b to both side walls 6 are well rounded. Such an inner lining 5a can also be described as a drain block.

Figure 5:
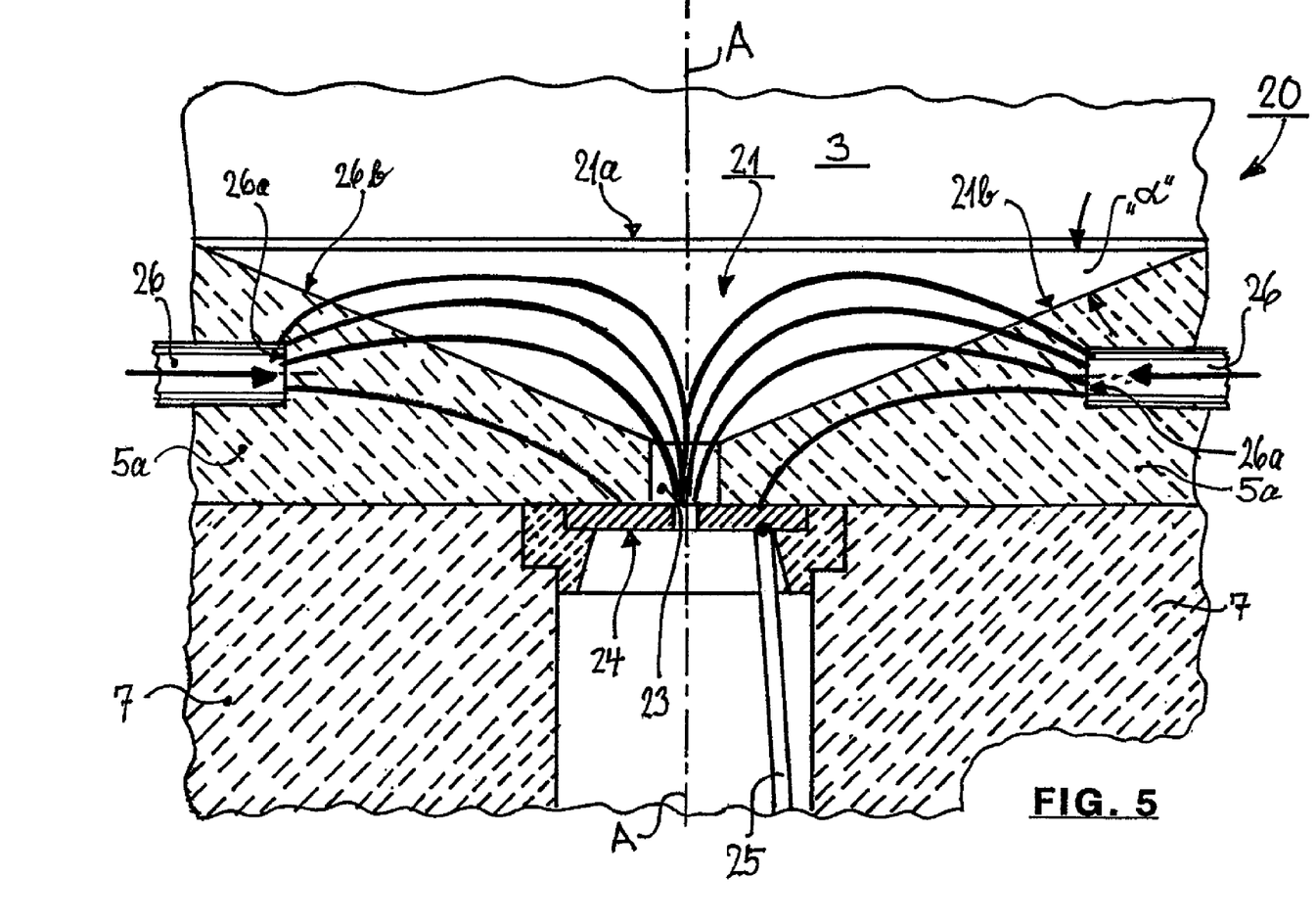

In addition FIG. 5 shows the following: curved, thick lines are used to indicate the current paths that emanate from the two electrodes 26 that are of the same polarity. The main current transfer to the inner lining 5a takes place via the front end surfaces 26a of the electrodes 26 that are under spring pressure in the direction shown by the arrow. As most molten glasses still have a lower specific electrical resistance than the inner lining 5a that is either at the same or a lower temperature, most of the current flows through the surface of the inner lining 5 a that has glass contact directly into the glass and through this in the direction of the drainage opening 23 and the electrode plate 24. Only a relatively small proportion of the current flows through the inner lining 5a. The glass in the immediate vicinity of the front end surfaces 26a and the inner lining 5a and the glass in the drainage slit 21 conduct the current directly to the drainage opening 23 and the electrode plate 24. The angle "α" of the sloping surfaces 21b is shown as 24 degrees in the drawing and can lie between 15 and 45 degrees.

This brings the following advantages: firstly there are no longer any metal electrodes that are surrounded by the glass to become corroded. As a result, no complex reactions that lead to the formation of a contact layer take place on the electrode surface. This layer is comprised of several components, in the main however, from compounds of molybdenum or zircon and oxygen or sulphur. Although the layer is basically thin, changes in operating conditions can cause erosion to some of the layer, and this appears as a dark mark in the production glass. Oxygen bubbles frequently occur simultaneously or as a consequence of such reactions.

Secondly, the flow channel 1 and in particular the drainage slit 21 are free of any obstacle that cause a disturbance or problems, so the bottom glass with its cords can flow uninterrupted across the whole width and evenly from the bottom surface 5b and the side walls 6 to the drainage opening 23.

Figure 6:
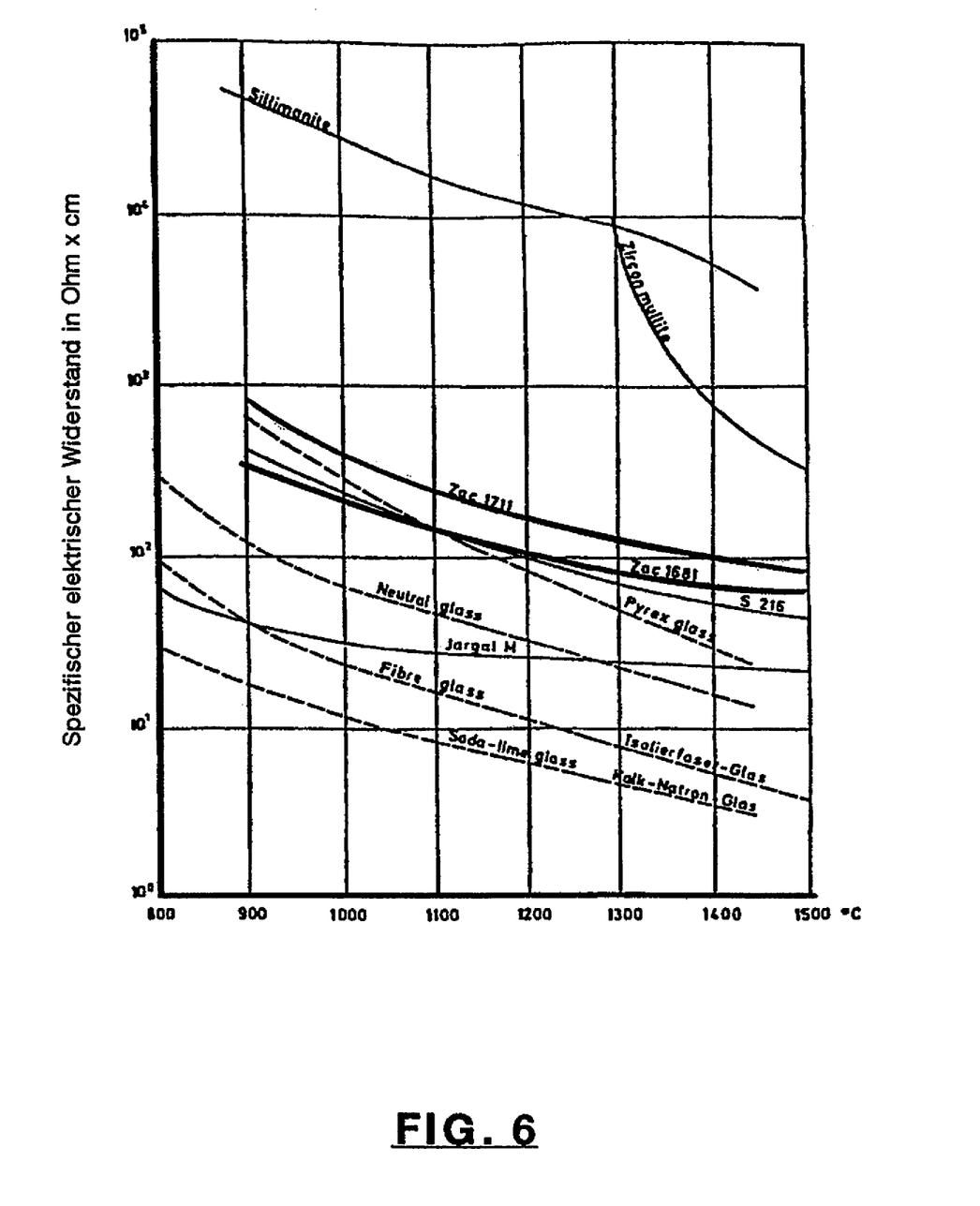

The diagram in FIG. 6 shows temperature values from 800 to 1500° C. on the abscissa and on the ordinate the values for the specific electrical resistance between 1 and $10^5$ ohm.cm for various mineral materials and glass types that are found in a glass furnace. It should be noted that the ordinate is divided into orders of magnitude and that the curves for ZAC 1681 and ZAC 1711 are nearer to the curves for certain glasses than other mineral materials used in furnace building. Incidentally, the terms ZAC 1681 and ZAC 1711 are the same as ER 1681 and ER 1711 used by Trier. In contrast the values for sillimanite and zircon mullite are 1 to 2 orders of magnitude above those of the fusion cast materials mentioned, so they cannot be considered to be electricity conductors.

ZAC 1681 material is comprised of solid crystals, held together by a "glass." This glass forms approximately 20% of the complete block and among other things it is responsible for the main part of the electrical conductivity. This in turn leads to the conclusion that the current is not conducted evenly through a block, but through the limited volume of the glassy phase, which inevitably is then heated slightly more than the main mass of the block. However, despite this fact, the temperatures within the inner layer 5a are much lower during operation than the temperatures at which the glassy phase could become liquid and capable of flow.

In short, the invention concerns a process and apparatus for the extraction of molten glass (3) from flow channels (1), that lead to an extraction point (8) for production glass, whereby the flow channel (1) has a glass-resistant inner lining (5a) and whereby a drainage unit (20) for bottom glass is installed upstream of the extraction point (8) for the production glass. In order to protect electrodes (22, 26) from the molten glass (3), but still have a local and temporal influence on the temperature profile within the flow cross-section, in accordance with the invention the following is suggested:

a) at least in the area of the drainage opening (20) the inner lining (5a) is made of a fusion cast, electrically conductive material and has a drainage opening (23) for the bottom glass with a drainage slit (21) above, and that b) at least two electrodes (22, 26) are installed on opposite sides of the flow channel (1) and the drainage unit (20), and the front end surfaces (22a) of these electrodes are inserted so far into the inner layer (5a) in the direction of the molten glass (3), that the majority of the electric current flows through the molten glass (3) to an electrode plate (24).

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit of scope of the present invention. It should be understood that I wish to embody within the scope of the patent warranted heron all such modifications as reasonably and properly come within the scope of my contribution to the art.

REFERENCE NUMBERS

1 Flow channel
1a Substructure
1b Superstructure
1c Joint
2 Flow direction
3 Molten glass
4 Melt surface
5 Inner lining
5a Inner lining (drainage block)
5b Bottom surface
6 Side walls
7 Thermal insulation
8 Extraction point
9 Support frame
10 Gas burner
11 Measuring opening
12 Waste gas flue
13 Measuring opening
14 Measuring opening
15 Free space
16 Drainage unit
17 Drainage slit
21a Inlet opening
21b Sloping surfaces
22 Electrodes
22a Front end surfaces
23 Drainage opening
24 Electrode plate
25 Connection cable
26 Electrodes
26a Front end surfaces

The invention claimed is:

1. A process for the removal of molten glass from flow channels that are installed for the transport of production glass from a glass furnace to an extraction point, whereby the flow channel has a glass-resistant inner lining that is surrounded externally by a mineral thermal insulating layer and whereby drainage equipment for a bottom glass is installed upstream of the extraction point for the production glass, comprising the steps:

forming at least a portion of the inner lining from a fusion cast, electrically conductive mineral material from the group of AZS and ZAC compounds;

providing a drainage opening for the bottom glass through the electrically conductive mineral material with a drainage slit that runs perpendicular to the flow direction installed above it, installing at least two rod-shaped electrodes on opposite sides of the flow channel and the drainage equipment for the bottom glass, by inserting front ends of these rod-shaped electrodes through an outer surface and into the electrically conductive mineral material of the inner lining in the direction of the molten glass;

biasing the electrodes in the direction of the molten glass with a spring located at a rear end of the electrodes, spaced away from the inner lining such that a front surface of the electrodes is pressed against the inner lining; and energizing the at least two electrodes that have been inserted into the electrically conductive mineral material of the inner lining in the direction of the molten glass to such an extent that the front ends terminate within the inner lining, not in contact with the molten glass, but a short distance from an interface between the inner lining and the molten glass so that a majority of an electrical current flows through the molten glass in the drainage slit to an electrode plate that is installed below the drainage opening, so that the bottom glass is heated more strongly than the production glass above it.

2. A process according to claim 1, wherein the electrodes located opposite one another are installed above a virtual horizontal plane where a phase boundary between the production glass and the bottom glass in the flow channel exists.

3. A process according to claim 1, wherein the electrodes located opposite one another are installed below a virtual horizontal plane where a phase boundary between the production glass and the bottom glass in the flow channel exists.

4. An apparatus for the extraction of molten glass from a flow channel for the transport of production glass from a glass furnace to an extraction point, whereby the flow channel has a glass-resistant inner lining surrounded on the outside by a mineral thermal insulation material, and whereby drainage equipment for bottom glass is installed upstream of the extraction point for the production glass, comprising:

an inner lining at least partially formed of fusion cast, electrically conductive mineral material from the group of AZS and ZAC compounds, a drainage opening for the bottom glass provided in the electrically conductive mineral material of the inner lining communicating with a drainage slit that extends across a width of the flow channel, at least two electrodes installed on opposite sides of the flow channel and the drainage opening, the electrodes being rod-shaped with their front ends inserted through an outer surface of the electrically conductive mineral material of the inner lining and so far into the inner lining in the direction of the glass, yet without having any contact with the glass, so that a majority of an electrical current from the electrodes flows through the molten glass to an electrode plate installed below the drainage opening, a front end of the electrodes being biased in the direction of the glass against the inner lining by a spring located at a rear end of the electrodes.

5. An apparatus according to claim 4, wherein the opposing electrodes are installed at a level above an inlet opening for the bottom glass.

6. An apparatus according to claim 4, wherein the opposing electrodes are installed at a level below an inlet opening for the bottom glass.

7. An apparatus according to claim 4, wherein the drainage slit, when viewed in the cross-section of the flow channel, is narrowed from an inlet opening to the drainage opening by two sloping surfaces.

8. An apparatus according to claim 7, wherein the sloping surfaces are arranged at an angle "$\alpha$" between 15 and 45 degrees to the horizontal.

9. An apparatus according to claim 4, wherein a horizontal component of axes of the electrodes is aligned with a vertical axis, that runs through the drainage opening.

10. A process for the removal of molten glass from flow channels that are installed for the transport of production glass in a flow direction from a glass furnace to an extraction point, whereby the flow channel has a glass-resistant inner lining surrounded externally by a mineral thermal insulating material and whereby drainage equipment for a bottom glass is installed upstream of the extraction point for the production glass, comprising the steps:

forming at least a portion of the inner lining from a fusion cast, electrically conductive mineral material selected from a group comprising at least one of AZS and ZAC compounds;

installing a drainage slit, extending perpendicular to the flow direction, in the electrically conductive mineral materials of the inner lining above a drainage opening for the bottom glass as the drainage equipment, installing an electrode plate below the drainage opening, installing at least two rod-shaped electrodes on opposite sides of the flow channel and the drainage equipment, and inserting front ends of the rod-shaped electrodes through an outer surface and into the electrically conductive mineral material of the inner lining towards an interior of the flow channel, flowing molten glass through the flow channel, biasing the electrodes in the direction of the molten glass with a spring located at a rear end of the electrodes, spaced away from the inner lining such that a front surface of the electrodes is pressed against the inner lining; and energizing the electrodes that have been inserted into the electrically conductive mineral material of the inner lining to such an extent that the font ends terminate within the inner lining, not in contact with the molten glass, but a short distance from an interface between the inner lining and the molten glass so that a majority of an electrical current flows through the molten glass in the drainage slit to the electrode plate, so that the bottom glass is heated more strongly by the electrodes than the production glass above it.

11. A process according to claim 10, wherein the step of installing the electrodes comprises installing the electrodes above a virtual horizontal plane where a phase boundary between the production glass and the bottom glass in the flow channel exists.

12. A process according to claim 10, wherein the step of installing the electrodes comprises installing the electrodes below a virtual horizontal plane where a phase boundary between the production glass and the bottom glass in the flow channel exists.

13. An apparatus for the extraction of molten glass from a flow channel for the transport of production glass from a glass furnace to an extraction point, comprising:

a glass-resistant inner lining provided in the flow channel, a mineral thermal insulation material surrounding an outside of the flow channel, drainage equipment for bottom glass in the form of a drainage opening for the bottom glass provided in the inner lining below and communicating with a drainage slit in the inner lining that extends across a width of the flow channel, located upstream of the extraction point for the production glass, an electrode plate located below the drainage opening, at least a portion of the inner lining, being formed of fusion cast, electrically conductive mineral material from the group of AZS and ZAC compounds, and at least two electrodes located on opposite sides of the flow channel and the drainage opening, the electrodes being rod-shaped with their front ends inserted through an outer surface of the electrically conductive mineral material of the inner lining and so far into the inner lining in the direction of the flow channel, yet without being exposed in the flow channel, so that a majority of an electrical current from the electrodes will flow through the molten glass in the flow channel to the electrode plate, a front end of the electrodes being biased in the direction of the glass against the inner lining by a spring located at a rear end of the electrodes, spaced away from the inner lining.

14. An apparatus according to claim 13, wherein the opposing electrodes are installed at a level above the drainage slit for the bottom glass.

15. An apparatus according to claim 13, wherein the opposing electrodes are installed at a level below the drainage slit for the bottom glass.

16. An apparatus according to claim 13, wherein the drainage slit, when viewed in the cross-section of the flow channel, is narrowed from an inlet opening to the drainage opening by two sloping surfaces.

17. An apparatus according to claim 16, wherein the sloping surfaces are each arranged at an angle "$\alpha$" between 15 and 45 degrees to the horizontal.

18. An apparatus according to claim 13, wherein a horizontal component of axes of the electrodes is aligned with a vertical axis, that runs through the drainage opening.

* * * * *